(12) United States Patent
Zia et al.

(10) Patent No.: US 12,083,872 B2
(45) Date of Patent: Sep. 10, 2024

(54) DOOR ASSEMBLIES HAVING FIXED WINDOW GLASS INSERTION SLITS, VEHICLES INCORPORATING THE SAME, AND METHODS OF INSTALLING A FIXED WINDOW GLASS

(71) Applicant: Toyoda Gosei Co., Ltd., Kiyosu (JP)

(72) Inventors: Kashif Zia, Troy, MI (US); Kentaro Adachi, Aichi (JP); Ruben Vazquez, Troy, MI (US)

(73) Assignee: Toyoda Gosei Co., Ltd., Kiyosu Aichi-Ken (JP)

( * ) Notice: Subject to any disclaimer, the term of this patent is extended or adjusted under 35 U.S.C. 154(b) by 986 days.

(21) Appl. No.: 17/085,439

(22) Filed: Oct. 30, 2020

(65) Prior Publication Data

US 2022/0134854 A1 May 5, 2022

(51) Int. Cl.
| | | |
|---|---|---|
| *B60J 10/78* | (2016.01) | |
| *B60J 5/04* | (2006.01) | |
| *B60J 10/20* | (2016.01) | |
| *B60J 10/34* | (2016.01) | |

(52) U.S. Cl.
CPC ............. *B60J 10/78* (2016.02); *B60J 5/0402* (2013.01); *B60J 10/20* (2016.02); *B60J 10/34* (2016.02)

(58) Field of Classification Search
CPC .................................. B60J 10/78; B60J 10/32
See application file for complete search history.

(56) References Cited

U.S. PATENT DOCUMENTS

| 9,920,566 B1* | 3/2018 | Bennett ................. E06B 3/5454 |
| 2003/0168882 A1 | 9/2003 | Naito et al. |
| 2006/0103047 A1* | 5/2006 | Zwolinski ................ B60J 10/15 |
| | | 264/173.17 |
| 2008/0289285 A1* | 11/2008 | Terazawa .................. B60J 10/78 |
| | | 52/716.7 |
| 2015/0251524 A1* | 9/2015 | Goto ...................... B60J 5/0402 |
| | | 52/204.71 |
| 2017/0028830 A1* | 2/2017 | Yamada ................... B60J 10/75 |

FOREIGN PATENT DOCUMENTS

JP   H8156585 A   6/1996

* cited by examiner

*Primary Examiner* — Marcus Menezes
(74) *Attorney, Agent, or Firm* — Dinsmore & Shohl LLP (57) ABSTRACT

A door assembly includes a door frame, a first window glass, and a holding member. The door frame includes a first window seal and a second window frame. The first window seal at least partially defines a first window opening. The second window frame at least partially defines a second window opening. The second window frame having a division bar that separates the first window opening and the second window opening. The first window seal having a bottom seal member and a side seal member that extends between the bottom seal member and the division bar. The bottom seal member includes a slit extending along a longitudinal direction of the bottom seal member. The first window glass is inserted into the first window opening through the slit. The holding member is coupled to the bottom seal member to inhibit movement of the first window glass with respect to the first window opening.

19 Claims, 5 Drawing Sheets

DOOR ASSEMBLIES HAVING FIXED WINDOW GLASS INSERTION SLITS, VEHICLES INCORPORATING THE SAME, AND METHODS OF INSTALLING A FIXED WINDOW GLASS

TECHNICAL FIELD

The present specification generally relates to door assemblies for a vehicle, and more particularly, door assemblies having a fixed window seal through which a fixed window glass may be installed.

BACKGROUND

It has been known to provide vehicles with door assemblies having both a fixed window glass and a movable window glass. In the previously known door assemblies, the fixed window glass, commonly referred to as a quarter window, and a fixed window seal are both molded onto a door frame. As the fixed window glass is encased within the fixed window seal during the molding process that forms and molds the fixed window seal to the door frame, variations in dimensions in the fixed window glass may results in breakage of the fixed window glass.

Accordingly, there is a need for a door frame assemblies, vehicles, and methods, that allow for the installation of the fixed window glass within the fixed window seal after forming the fixed window seal on the door frame while avoiding breakage of the fixed window glass during the simultaneous installation of the fixed window glass into the fixed window seal and the molding of the fixed window seal on the door frame.

SUMMARY

In one embodiment, a door assembly includes a door frame, a first window glass, and a holding member. The door frame includes a first window seal and a second window frame. The first window seal at least partially defines a first window opening. The second window frame at least partially defines a second window opening. The second window frame having a division bar that separates the first window opening and the second window opening. The first window seal having a bottom seal member and a side seal member that extends between the bottom seal member and the division bar. The bottom seal member includes a slit extending along a longitudinal direction of the bottom seal member. The first window glass is configured to be inserted into the first window opening through the slit. The holding member is coupled to the bottom seal member to inhibit movement of the first window glass with respect to the first window opening.

In another embodiment, a vehicle includes a door frame, a first window glass, and a holding member. The door frame includes a first window seal and a second window frame. The first window seal at least partially defines a first window opening. The second window frame at least partially defines a second window opening. The second window frame having a division bar that separates the first window opening and the second window opening. The first window seal having a bottom seal member and a side seal member that extends between the bottom seal member and the division bar. The bottom seal member includes a slit extending along a longitudinal direction of the bottom seal member. The first window glass is configured to be inserted into the first window opening through the slit. The holding member is coupled to the bottom seal member to inhibit movement of the first window glass with respect to the first window opening.

In still another embodiment, a method of installing a first window glass into a first window opening of a door frame includes providing a first window seal that defines the first window opening. The first window seal includes a bottom seal member having a slit. The method also includes inserting the first window glass into the first window opening through the slit formed in bottom seal member of the first window seal. The method further includes coupling a holding member to the bottom seal member of the first window seal to inhibit movement of the first window glass with respect to the first window seal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a door assembly, a fixed window glass, and a holding member.

The door assembly at least partially defines a fixed window opening and a movable window opening that are separated by a division bar. A fixed window seal is molded onto the division bar to form the fixed window opening. The fixed window seal includes a slit configured to allow the insertion of the fixed window glass into the fixed window opening after the fixed window seal is molded onto the division bar. The holding member is coupled to the fixed window seal to cover the slit to inhibit movement of the fixed window glass with respond to the fixed window opening. As the fixed window glass is installed after the formation and molding of the fixed window seal onto the division bar, breakage of the fixed window glass during the molding process of the fixed window seal onto the division bar is avoided.

The present specification also provides a method of installing a fixed window glass into a fixed window opening of a door frame. The method includes providing a first window seal that defines the first window opening. The first window seal includes a bottom seal member having a slit. The method also includes inserting the first window glass into the first window opening through the slit formed in bottom seal member of the first window seal. The method further includes coupling a holding member to the bottom seal member of the first window seal to inhibit movement of the first window glass with respect to the first window seal.

Various embodiments of door assemblies, vehicles, and methods are described in detail below with reference to the appended drawings.

As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/−vehicle Z-direction as depicted), and is transverse to the vehicle longitudinal direction. The term "vehicle vertical direction" refers to the upward-downward direction of the vehicle (i.e., in the +/−vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Figure 1:
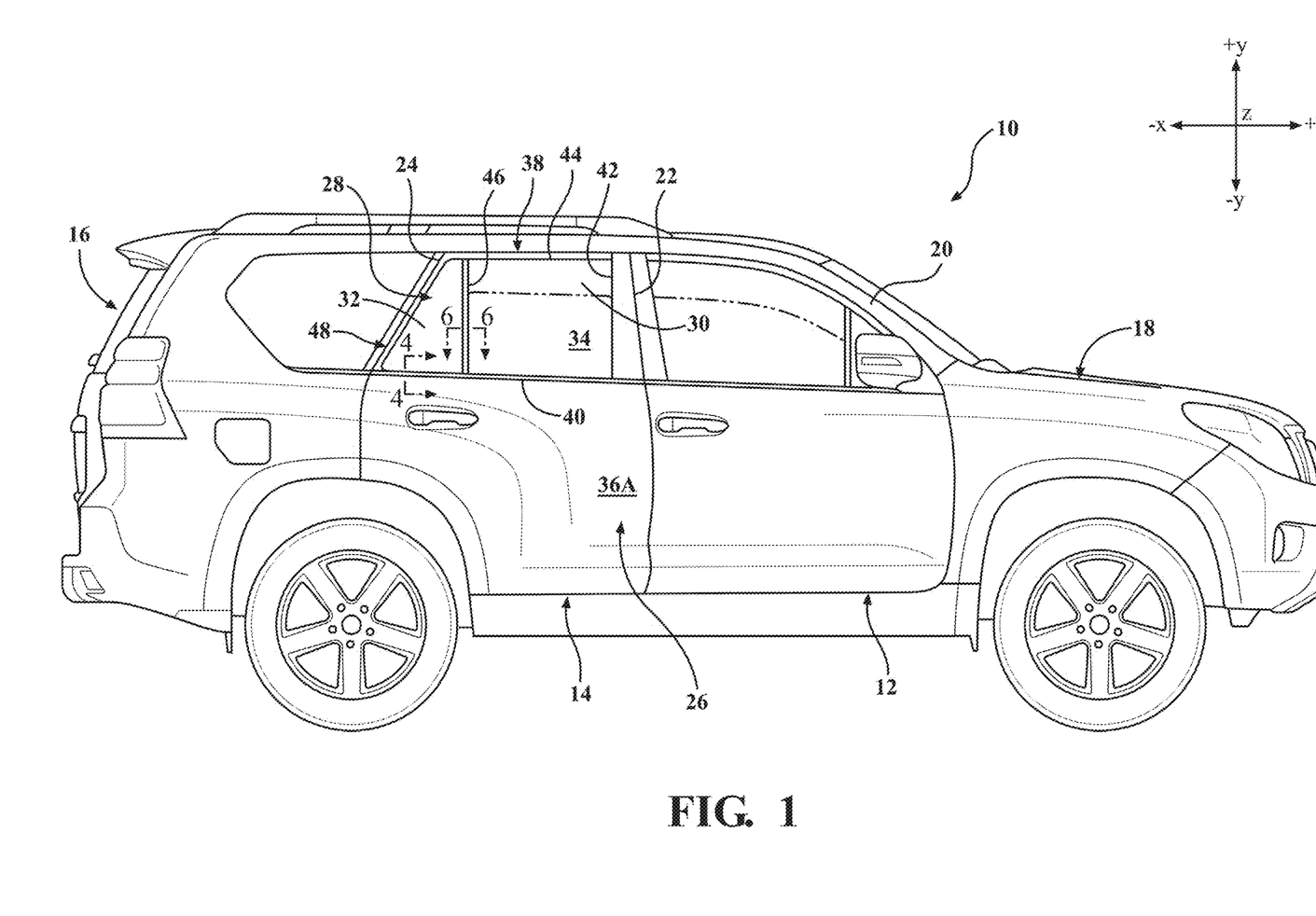
FIG. 1 schematically depicts a side view of a vehicle including a front door assembly and a rear door assembly according to one or more embodiments shown or described herein.

Referring to FIG. 1, a vehicle 10 is depicted. The vehicle 10 includes a front door assembly 12, a rear door assembly 14, and a cargo door assembly 16. The front door assembly 12, the rear door assembly 14, and the cargo door assembly 16 are hingedly coupled to a vehicle body 18. The vehicle body 18 may include an A-pillar structure 20, a B-pillar structure 22, and a C-pillar structure 24.

The front door assembly 12 is coupled to the A-pillar structure 20, the rear door assembly 14 is coupled to the B-pillar structure 22, and the cargo door assembly 16 is coupled to a rear portion of the vehicle body 18. In some embodiments, the front door assembly 12 is hingedly coupled to the A-pillar structure 20, the rear door assembly 14 is hingedly coupled to the B-pillar structure 22, and the cargo door assembly 16 is hingeldy coupled to the rear portion of the vehicle body 18. In other embodiments, the rear door assembly 14 may be severally coupled to the B-pillar structure 22, such as when the rear door assembly 14 is sliding door or when the rear door assembly 14 is hingedly coupled to the C-pillar structure 24 (i.e., a rear-hinged door).

The rear door assembly 14 include a rear door frame 26 that at least partially defines a first or fixed window opening 28 and a second or movable window opening 30. The fixed window opening 28 is configured to receive a first or fixed window glass 32. The movable window opening 30 is configured to receive a second or movable window glass 34. As will be described in greater detail below, the fixed window glass 32 is fixed within the fixed window opening 28 such that upon installation of the fixed window glass 32 into the fixed window opening 28, the fixed window glass 32 is inhibited from moving with respect to the fixed window opening 28.

The movable window glass 34 is configured to move with respect to the movable window opening 30. The movable window glass 34 is configured to move between a closed position, as shown in solid lines in FIG. 1, and at least a partially opened position, as shown in broken lines in FIG. 1. In the closed position, the movable window glass 34 substantially fills the movable window opening 30 to prevent access to an interior of the vehicle 10 through the movable window opening 30. In the at least partially opened position, the movable window glass 34 is displaced in the vehicle vertical direction away from the movable window opening 30 so as to permit access to the interior of the vehicle through the movable window opening 30.

For example, the movable window glass 34 may be selectively moved in the vehicle vertical direction in the orientation of FIG. 1 between the closed positon and the at least partially opened position. Specifically, the movable window glass 34 may be configured to be positioned in various positions between closed positon and the at least partially opened position. In some embodiments, the movable window glass 34 may be operated by mechanical or electrical actuator (not shown).

Figure 4:
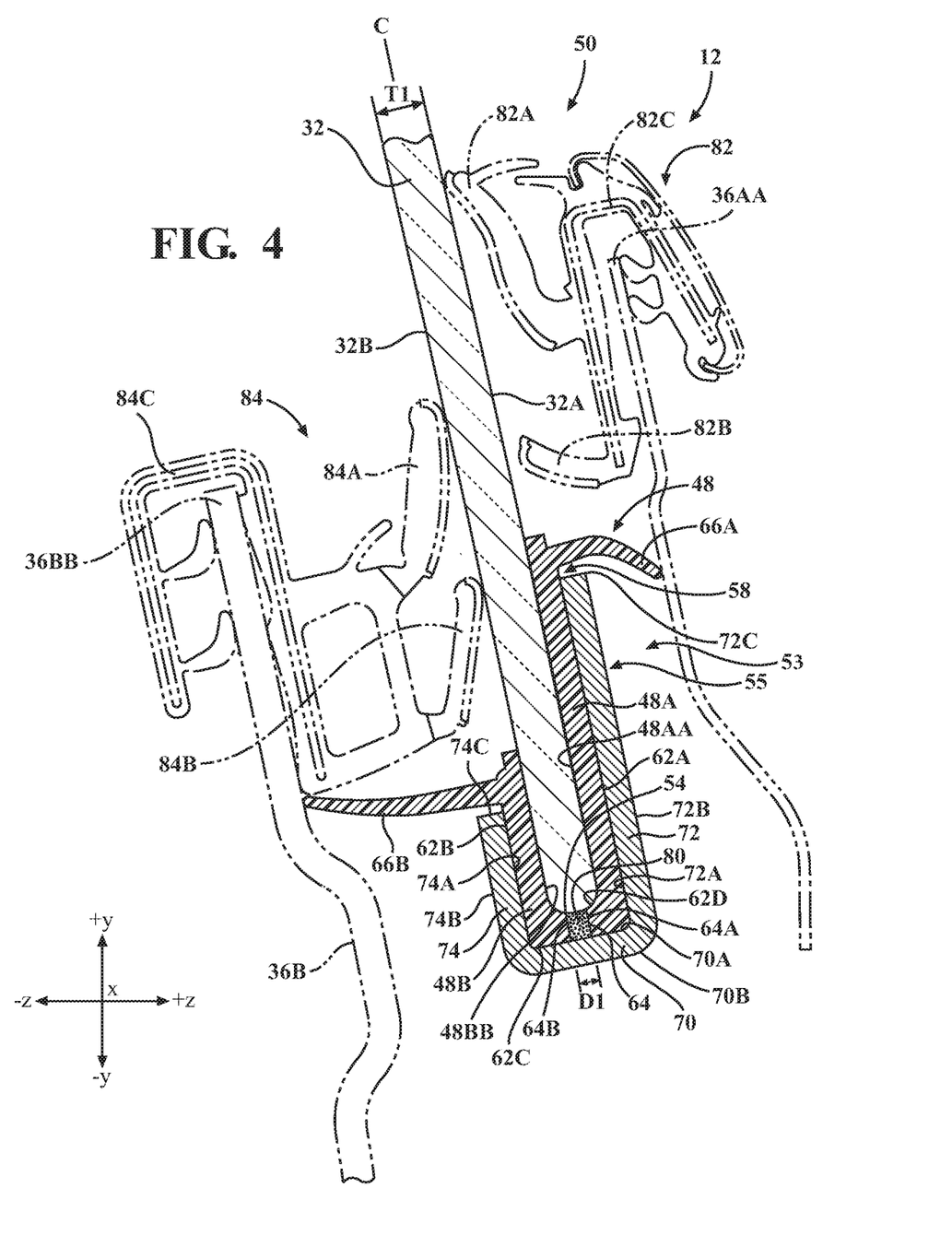
FIG. 4 schematically depicts a partial cross-sectional view of the fixed window assembly taken along the line 4-4 of FIG. 1, according to one or more embodiments shown or described herein.

The rear door frame 26 includes an outer panel 36A and an interior panel 36B, as shown in FIG. 4. Referring back to FIG. 1, the rear door frame 26 includes a movable window frame 38 that extends from a sill portion 40 defined by an upper edge of the outer panel 36A. The movable window opening 30 is defined by the sill portion 40 and the movable window frame 38. The movable window frame 38 may include a front frame 42, an upper frame 44, and a division bar 46. The front frame 42 and the division bar 46 extend upwardly in the vehicle vertical direction from the sill portion 40 to the upper frame 44. The upper frame 44 extends between an upper end of the front frame 42 and the division bar 46 such that the sill portion 40, the front frame 42, the upper frame 44, and the division bar 46 define the movable window opening 30.

As shown in FIG. 1, the division bar 46 separates the movable window opening 30 from the fixed window opening 28. The fixed window opening 28 is defined by a first or fixed window seal 48 of the rear door frame 26 and the division bar 46 of the movable window frame 38. As will be discussed in greater detail, the fixed window seal 48 is formed of a moldable material that is molded onto the movable window frame 38, specifically, the division bar 46 and the upper frame 44.

Figure 2:
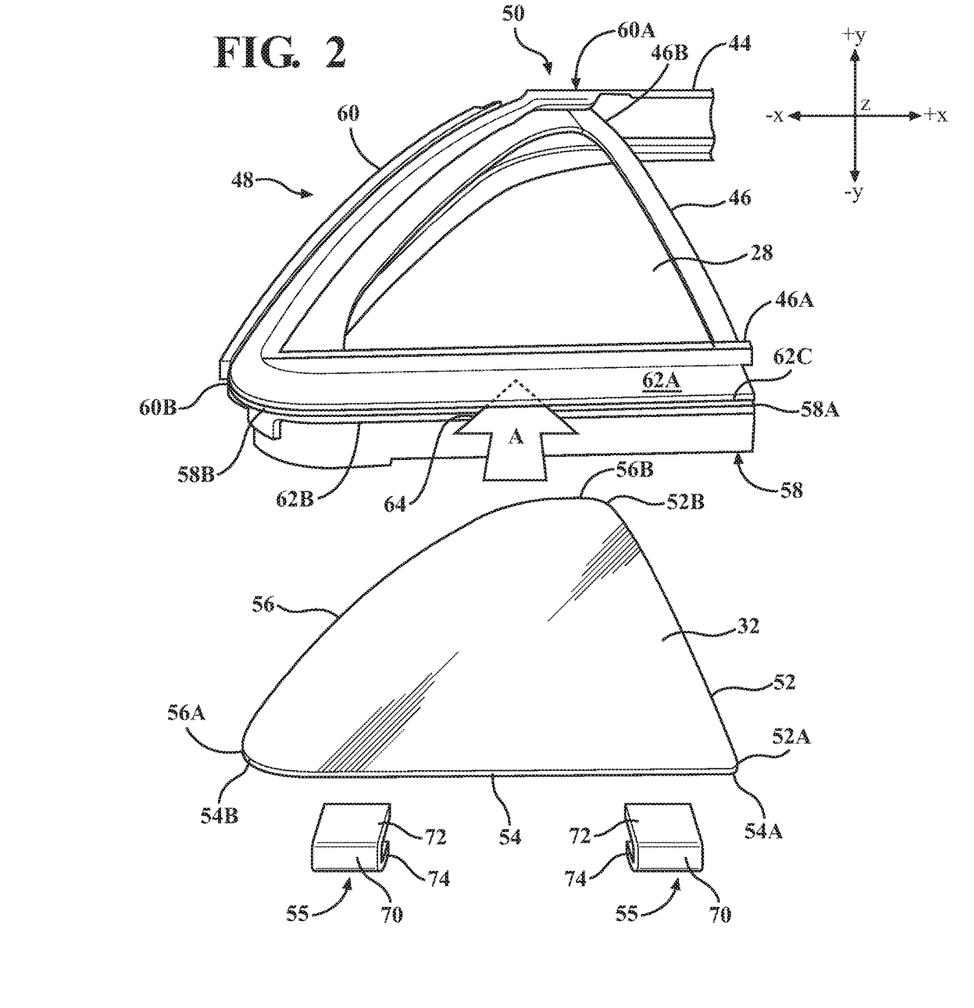
FIG. 2 schematically depicts a partial exploded view of a fixed window assembly of the rear door assembly of FIG. 1, according to one or more embodiments shown or described herein.

Referring to FIG. 2, a fixed window assembly is generally illustrated at 50. The fixed window assembly 50 includes the fixed window glass 32, the fixed window seal 48, and a holding member 53. As shown in FIG. 2, the fixed window glass 32 is commonly referred to as a quarter glass. As will be described in greater detail below, the holding member 53 is at least one of a retainer 55 or an adhesive 80. In some embodiments, the holding member 53 is both the retainer 55 and the adhesive 80. In some embodiments, the retainer 55 is a pair of retainers 55.

The fixed window glass 32 includes a side edge 52, a bottom edge 54, and a sloped edge 56. The side edge 52 includes a bottom end 52A and an opposite top end 52B. The bottom edge 54 includes a first end 54A and an opposite second end 54B. The sloped edge 56 includes a lower end 56A and an opposite upper end 56B. The bottom end 52A of the side edge 52 is joined with the first end 54A of the bottom edge 54 such that the side edge 52 extends upwardly from the first end 54A of the bottom edge 54. The lower end 56A of the sloped edge 56 is joined with the second end 54B of the bottom edge 54 and the upper end 56B of the sloped edge 56 is joined with the top end 52B of the side edge 52 such that the sloped edge 56 extends generally upwardly and inwardly from the second end 54B of the bottom edge 54 to the top end 52B of the side edge 52. In some embodiments, the junction of the lower end 56A of the sloped edge 56 and the second end 54B of the bottom edge 54 is formed having a curvilinear shape.

The fixed window seal 48 includes a bottom seal member 58 and a side seal member 60. The bottom seal member 58 includes a first end 58A and an opposite second end 58B. The side seal member 60 includes a top end 60A and an opposite bottom end 60B. The first end 58A of the bottom seal member 58 is fixed to a lower end 46A of the division bar 46. The top end 60A of the side seal member 60 is fixed to an upper end 46B of the division bar 46 at a junction between the upper end 46B of the division bar 46 and the upper frame 44.

The fixed window seal 48 is formed as a one piece structure in bottom seal member 58 and the side seal member 60 are integrally formed or molded as a one piece monolithic structure. In some embodiments, the fixed window seal 48 may be formed from a variety of natural or synthetic materials, illustratively including a thermoplastic elastomer (TPE) such as thermoplastic vulcanisate (TPV). TPV materials may give consistent and predictable performance, extended durability, and light and moisture resistance.

As discussed above, the fixed window seal 48 is coupled to the movable window frame 38 after the formation of the movable window frame 38. Upon formation of the movable window frame 38, the fixed window seal 48 is molded onto the movable window frame 38. Specifically, the fixed window seal 48 is molded onto the movable window frame 38, specifically, the division bar 46. During the molding process, fixed window seal 48 is molded onto the division bar 46 such that the top end 60A of the side seal member 60 is molded onto the upper end 46B of the division bar 46 at the junction between the upper end 46B of the division bar 46 and the upper frame 44, and the first end 58A of the bottom seal member 58 is molded onto the lower end 46A of the division bar 46.

The bottom seal member 58 includes an exterior surface 62A, an opposite interior surface 62B, a bottom surface 62C, and an opposite upper surface 62D. The bottom surface 62C extends between the exterior surface 62A and the interior surface 62B. The upper surface 62D is an upper surface of the bottom seal member 58 and at least partially defines a boundary of the fixed window opening 28. The bottom seal member 58 also includes an elongated slit 64 that extends between the bottom surface 62C and the upper surface 62D. The slit 64 extends from the bottom surface 62C through the bottom seal member 58 to the upper surface 62D such that the slit 64 is in communication with the fixed window opening 28 and an exterior of the fixed window seal 48.

The slit 64 extends parallel with a longitudinal direction of a longitudinal axis of the bottom seal member 58. In some embodiments, the slit 64 extends at least partially between the between the first end 58A of the bottom seal member 58 and the second end 58B of the bottom seal member 58. In some other embodiments, the slit 64 traverses the bottom seal member 58 such that the slit 64 extends between the first end 58A of the bottom seal member 58 to the second end 58B of the bottom seal member 58.

Figure 3:
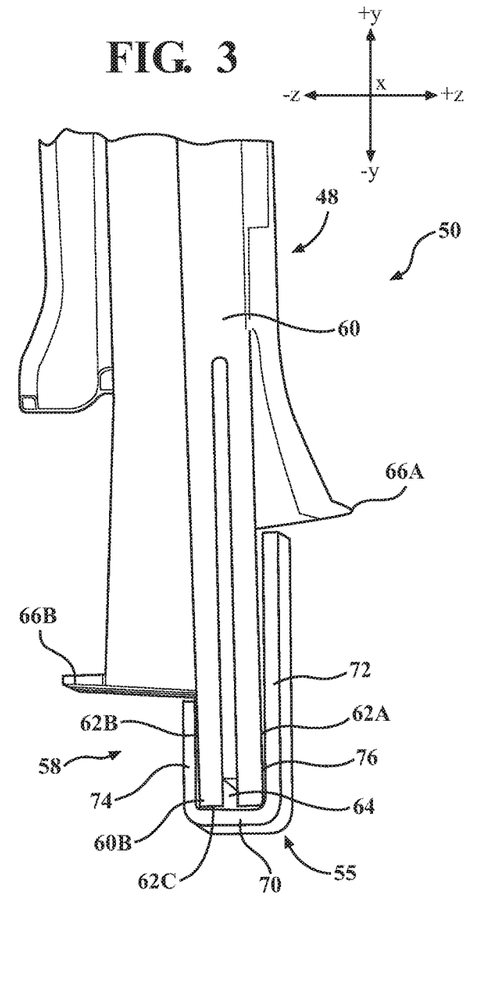
FIG. 3 schematically depicts a partial side view of the fixed window assembly of FIG. 2, according to one or more embodiments shown or described herein.

Referring to FIG. 3, the slit 64 may extends beyond the second end 58B of the bottom seal member 58 so as to extends partially along the side seal member 60. As shown in FIG. 3, the slit 64 extends upwardly from the junction of the second end 58B of the bottom seal member 58 and the bottom end 60B of the side seal member 60. Specifically, the slit 64 extends continuously along the bottom seal member 58 and at least a portion of the side seal member 60. In some embodiments, a length of the slit 64 is equal to or greater than a length between the first end 54A and the second end 54B of the bottom edge 54 of the fixed window glass 32.

In some embodiments, the slit 64 is formed during the molding of the fixed window seal 48 onto the division bar 46 of the movable window frame 38. In some other embodiments, the slit 64 is formed subsequent to the molding of the fixed window seal 48 onto the division bar 46 of the movable window frame 38. In such a case, the fixed window seal 48 is first molded onto the division bar 46 of the movable window frame 38, and then a cutting operation is performed to form the slit 64.

Referring to FIGS. 2 and 3, the retainers 55 are formed having a generally U-shape defined by a base wall 70, an exterior side wall 72, and an interior side wall 74. As shown in FIG. 2, the fixed window assembly 50 includes a pair of retainers 55. It is appreciated that the fixed window assembly 50 may include a single retainer 55, or a plurality of retainers 55, for example 2, 3, 4, or more. In some embodiments, the retainers 55 may be formed of a natural or synthetic material, such as a plastic, resin, or polymeric material that is integrally formed as a one piece monolithic structure. In some embodiments, the retainers 55 are formed of a metallic material that is stamped, extruded, or otherwise shaped to integrally form the retainers 55.

Referring to FIG. 2, the fixed window assembly 50 is illustrated in an uninstalled state. In the uninstalled state, the fixed window glass 32 and the holding member 53 is disengaged and spaced apart from the fixed window seal 48. Specifically, the retainers 55 are disengaged and spaced apart from the fixed window seal 48 and the adhesive 80 is not deposited within the slit 64. As will be discussed in greater detail below, the fixed window assembly 50 is moved from the uninstalled state to the installed state by inserting the fixed window glass 32 into the fixed window opening 28 through the slit 64 in the direction of arrow A, then coupling the holding member 53 to the fixed window seal 48. In some embodiments, the coupling of the holding member 53 includes coupling the retainers 55 to the fixed window seal 48. In some embodiments, the coupling of the holding member 53 includes depositing the adhesive 80, as shown in FIG. 4, within the slit 64. In some embodiments, the coupling of the holding member 53 includes depositing the adhesive 80 within the slit 64 and then coupling the retainers 55 to the fixed window seal 48.

Referring to FIGS. 3 and 4, the fixed window assembly 50 is illustrated in the installed state. In the installed state, the fixed window glass 32 is received within the fixed window opening 28 and the holding member 53 is coupled to the fixed window seal 48. The bottom seal member 58 is bisected by the slit 64 to form an exterior side portion 48A and an opposite interior side portion 48B. The exterior side portion 48A includes an inner surface 48AA that is opposite the exterior surface 62A of the bottom seal member 58. The interior side portion 48B includes an inner surface 48BB that is opposite the interior surface 62B of the bottom seal member 58.

Referring to FIG. 4, the base wall 70 includes an upper surface 70A and an opposite lower surface 70B. The exterior side wall 72 includes an inner surface 72A and an opposite outer surface 72B. The interior side wall 74 includes an inner surface 74A and an opposite outer surface 74B. A retainer cavity 76 is formed by the base wall 70, the exterior side wall 72, and the interior side wall 74. Specifically, the retainer cavity 76 is defined by the upper surface 70A of the base wall 70, the inner surface 72A of the exterior side wall 72, and the inner surface 74A of the interior side wall 74. As stated above, the retainers 55 may have a generally U-shape such that a distance between the upper surface 70A of the base wall 70 and a distal end 72C of the exterior side wall 72 is substantially equal to a distance between the upper surface 70A of the base wall 70 and a distal end 74C of the interior side wall 74. In some embodiments, the retainers 55 may have a generally J-shape in which one of the exterior side wall 72 and the interior side wall 74 is shorter than the other of the exterior side wall 72 and the interior side wall 74. As shown in FIGS. 3 and 4, the distance between the distal end 72C of the exterior side wall 72 and the upper surface 70A of the base wall 70 is greater than the distance between the distal end 74C of the interior side wall 74 and the upper surface 70A of the base wall 70.

In some embodiments, a distance between the inner surface 72A of the exterior side wall 72 and the inner surface 74A of the interior side wall 74 may be consistent along a length of the exterior side wall 72 and the interior side wall 74. In some other embodiments, the exterior side wall 72 and the interior side wall 74 may taper or narrow inwardly such that the distance between the inner surface 72A of the exterior side wall 72 and the inner surface 74A of the interior side wall 74 decreases moving from the upper surface 70A of the base wall 70 towards the distal end 72C of the exterior side wall 72 and the distal end 74C of the interior side wall 74. As will be described in greater detail below, the narrowing of the distal end 72C of the exterior side wall 72 and the distal end 74C of the interior side wall 74 increases a retention force applied by the retainers 55 to the bottom seal member 58 to retain the retainers 55 onto the bottom seal member 58 in the installed state so as to inhibit movement of the fixed window glass 32 with respect to the fixed window opening 28.

In the installed state, the plurality of retainers 55 may be coupled to the bottom seal member 58 such that the each of the plurality of retainers 55 are provided spaced apart so as to define a space between adjacent retainers 55. In some other embodiments, the plurality of retainers 55 may be coupled to the bottom seal member 58 such that each of the plurality of retainers 55 are provided so as to contact an adjacent retainer 55.

In the installed state, the inner surface 48AA of the exterior side portion 48A of the bottom seal member 58 contacts an outer surface 32A of the fixed window glass 32. The inner surface 48BB of the interior side portion 48B of the bottom seal member 58 contacts an inner surface 32B of the fixed window glass 32. The exterior surface 62A of the exterior side portion 48A of the bottom seal member 58 is configured to contact the inner surface 72A of the exterior side wall 72 of the retainer 55. The interior surface 62B of the interior side portion 48B of the bottom seal member 58 is configured to contact the inner surface 74A of the interior side wall 74 of the retainer 55. The bottom surface 62C of the bottom seal member 58 is configured to contact the upper surface 70A of the base wall 70 of the retainer 55.

Still referring to FIG. 4, the slit 64 is form by bisecting the bottom seal member 58 from the bottom surface 62C to the upper surface 62D to form the exterior side portion 48A and the interior side portion 48B. The slit 64 is defined by an exterior side wall 64A formed on the exterior side portion 48A and an interior side wall 64B formed on the interior side portion 48B. As shown in FIG. 4, a thickness of the slit 64 is less than a thickness of the fixed window glass 32. Specifically, a distance D1, thickness, between the exterior side wall 64A and the interior side wall 64B is constant as the slit 64 extends from the bottom surface 62C to the upper surface 62D. The distance D1 of the slit 64 is less than a thickness T1 of the fixed window glass 32 between the outer surface 32A and the inner surface 32B. The slit 64 is positioned on the bottom seal member 58 so as to be centered with respect to a centerline C of the fixed window glass 32. In some embodiments, the bottom seal member 58 is formed a rigid material that resists deformation. However, due to the slit 64 traversing the bottom surface 62C of the bottom seal member 58 and a partially extending into the side seal member 60, the fixed window glass 32 may be inserted through the slit 64. In some other embodiments, the bottom seal member 58 is formed of a resilient material that allow for deformation to insert the fixed window glass 32 through the slit 64.

In the installed state, as shown in FIG. 4, the adhesive 80 is deposited in the slit 64 to fill a gap formed between the exterior side wall 64A and the interior side wall 64B. The adhesive 80 is deposited in the slit 64 after the fixed window glass 32 is inserted through the slit 64. In some embodiments, adhesive 80 is deposited in the slit 64 after the fixed window glass 32 is inserted through the slit 64 and before the retainers 55 are coupled to the bottom seal member 58. The adhesive 80 is configured to fill the gap formed by the slit 64 to close the slit 64 thereby inhibiting the movement of the fixed window glass 32 with respect to the fixed window opening 28 and the fixed window seal 48.

As discussed in greater detail below, the adhesive 80 is deposited within the slit 64 after the fixed window glass 32 is inserted into the fixed window seal 48 through the slit 64 formed in the bottom seal member 58 to install the fixed window glass 32 within the fixed window opening 28 of the fixed window seal 48. The adhesive 80 is also deposited within the slit 64 prior to coupling the retainers 55 to the bottom seal member 58. It is appreciated that various types of adhesives may be used to close the slit 64, illustratively including solvent based adhesives, polymer dispersion adhesives, pressure sensitive adhesives, contact adhesives, hot-melt adhesives, multi-part or one-part reaction adhesives, or epoxies.

Still referring to FIG. 4, the bottom seal member 58 may also include an exterior seal lip 66A and an interior seal lip 66B. The exterior seal lip 66A extends outwardly from the exterior surface 62A of the bottom seal member 58. The exterior seal lip 66A may be positioned adjacent an upper end of the exterior side portion 48A so as to be positioned above the distal end 72C of the exterior side wall 72. The exterior seal lip 66A is configured to contact an interior surface of the outer panel 36A of the rear door frame 26. The interior seal lip 66B extends outwardly from the exterior surface 62A of the bottom seal member 58. The interior seal lip 66B may be positioned adjacent an upper end of the interior side portion 48B so as to be positioned above the distal end 74C of the interior side wall 74. The interior seal lip 66B is configured to contact an interior surface of the interior panel 36B of the rear door frame 26. The exterior seal lip 66A and the interior seal lip 66B are configured to provide sound and temperature insulation for the fixed window glass 32 and to prevent the ingress of water or other debris from entering the rear door assembly 14.

In some embodiments, the rear door assembly 14 is also provided with an exterior weather strip 82 and an interior weather strip 84. The exterior weather strip 82 includes an upper sealing finger 82A, a lower sealing finger 82B, and an engagement portion 82C. The upper sealing finger 82A and the lower sealing finger 82B are configured to contact the fixed window glass 32. The engagement portion 82C engages with an upper end 36AA of the outer panel 36A. The interior weather strip 84 includes an upper sealing finger 84A, a lower sealing finger 84B, and an engagement portion 84C. The upper sealing finger 84A and the lower sealing finger 84B are configured to contact the fixed window glass 32. The engagement portion 84C engages with an upper end 36BB of the interior panel 36B.

The exterior weather strip 82 and the interior weather strip 84 create at least a partial seal around the fixed window glass 32. The exterior weather strip 82 and the interior weather strip 84, in conjunction with the exterior seal lip 66A and the interior seal lip 66B, provide sound and temperature insulation for the fixed window glass 32 and to prevent the ingress of water and other debris from entering the rear door assembly 14.

Figure 5A:
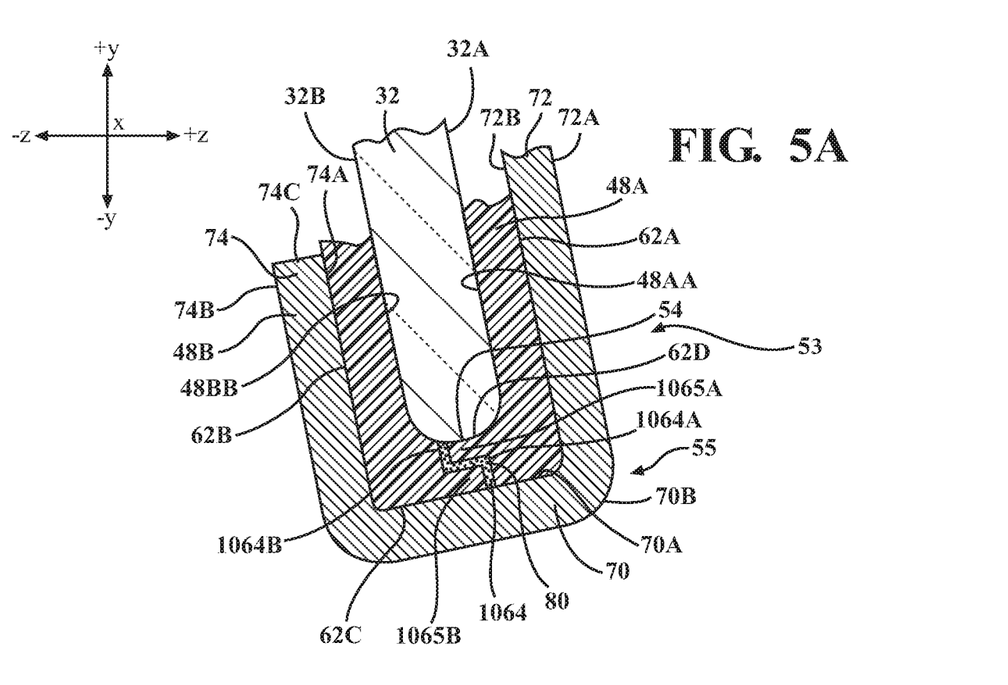
FIG. 5A schematically depicts an enlarged portion of the partial cross-sectional view of FIG. 4 in which an alternative configuration of a slit is illustrated, according to one or more embodiments shown or described herein.

It is appreciated that the slit 64 is not limited to the configuration illustrated in FIG. 4. As shown in FIG. 5A, an alternative configuration of the slit is illustrated at 1064. The slit 1064 is defined by an exterior side wall 1064A and an interior side wall 1064B. A protrusion 1065A extends outwardly from the exterior side wall 1064A and a protrusion 1065B extends outwardly from the interior side wall 1064B. The protrusion 1065A and the protrusion 1065B are offset and overlapped such that the slit 1064 does not linearly extend between the bottom surface 62C and the upper surface 62D of the bottom seal member 58. As such, a portion of the bottom edge 54 of the fixed window glass 32 that contacts the upper surface 62D of one of the exterior side portion 48A and interior side portion 48B is larger than a portion of the bottom edge 54 of the fixed window glass 32 that contacts the upper surface 62D of the other of the exterior side portion 48A and interior side portion 48B. The overlap between the protrusion 1065A and the protrusion 1065B inhibits the movement of the fixed window glass 32 with respect to the fixed window seal 48 and the fixed window opening 28. In some embodiments, the adhesive 80 may be deposited between the exterior side wall 1064A and the interior side wall 1064B to close and bind the slit 1064. In some other embodiments, the adhesive 80 may be omitted.

Figure 5B:
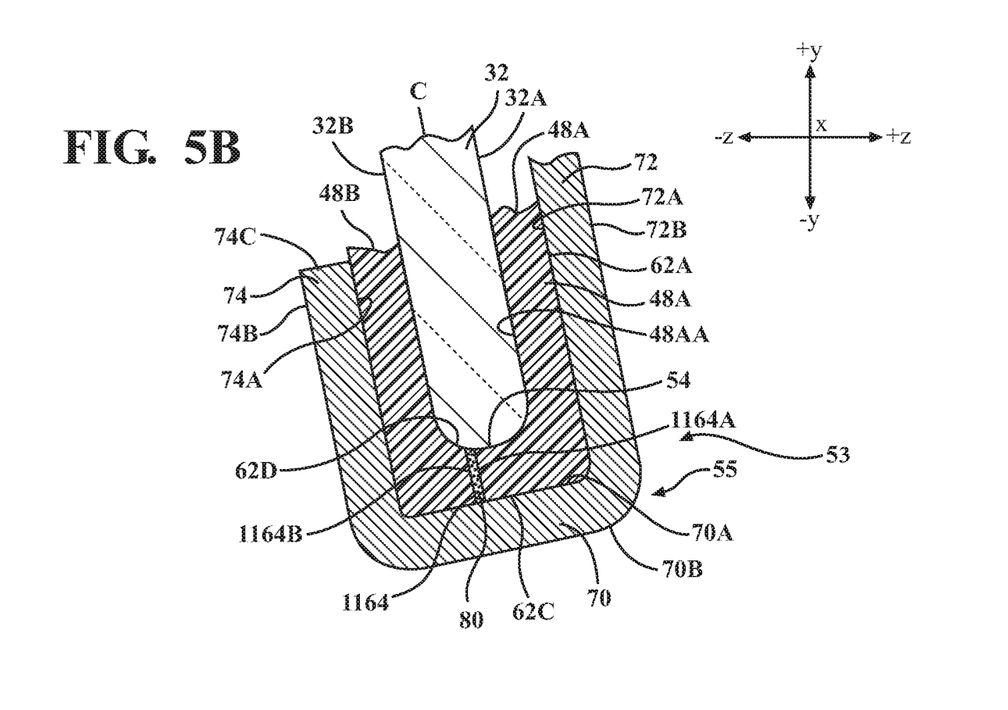
FIG. 5B schematically depicts an enlarged portion of the partial cross-sectional view of FIG. 4 in which another alternative configuration of the slit is illustrated, according to one or more embodiments shown or described herein.

As shown in FIG. 5B, another alternative configuration of the slit is illustrated at 1164. The slit 1164 is defined by an exterior side wall 1164A and an interior side wall 1164B. The slit 1164 extends linearly between the bottom surface 62C and the upper surface 62D of the bottom seal member 58. A distance between the exterior side wall 1164A and the interior side wall 1164B is constant as the slit 1164 extends from the bottom surface 62C to the upper surface 62D. However, the slit 1164 is offset with respect to the centerline C of the fixed window glass 32. As such, a portion of the bottom edge 54 of the fixed window glass 32 that contacts the upper surface 62D of one of the exterior side portion 48A and interior side portion 48B is larger than a portion of the bottom edge 54 of the fixed window glass 32 that contacts the upper surface 62D of the other of the exterior side portion 48A and interior side portion 48B. As such, a contact area between the bottom edge 54 of the fixed window glass 32 and the upper surface 62D of the bottom seal member 58 is increased which inhibits the movement of the fixed window glass 32 with respect to the fixed window seal 48 and the fixed window opening 28. In some embodiments, the adhesive 80 may be deposited between the exterior side wall 1164A and the interior side wall 1164B to close and bind the slit 1164. In some other embodiments, the adhesive 80 may be omitted.

Figures 5C, 5D:
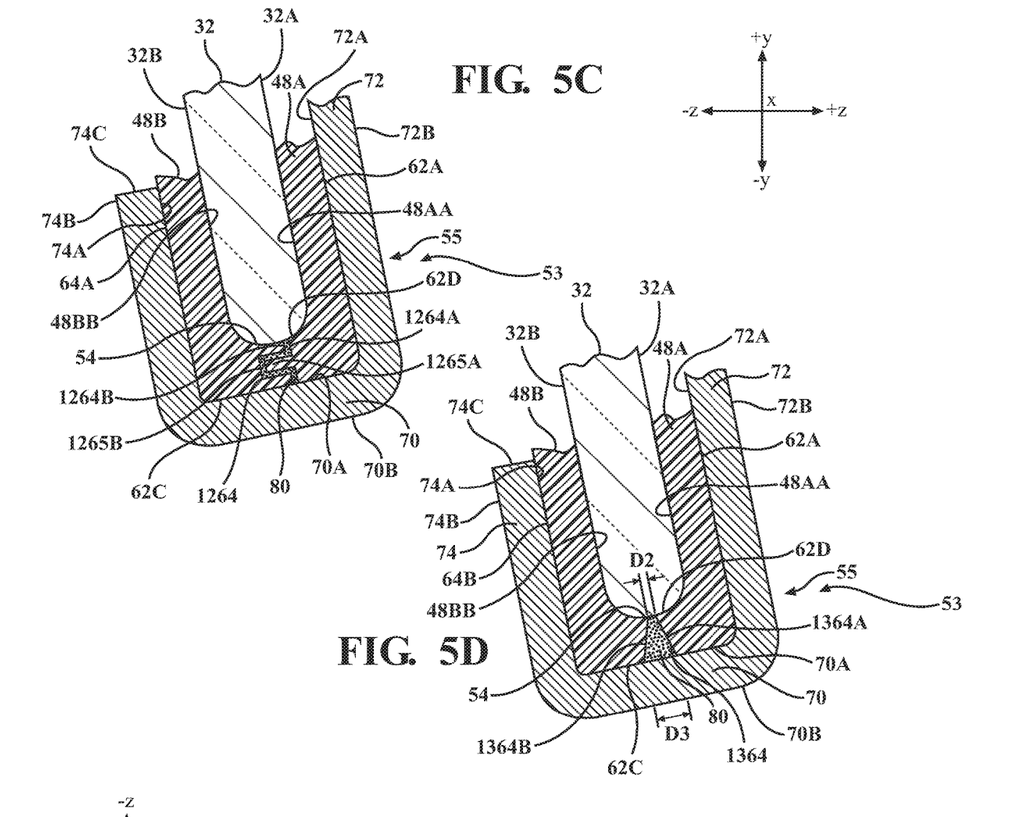
FIG. 5C schematically depicts an enlarged portion of the partial cross-sectional view of FIG. 4 in which another configuration of the slit is illustrated, according to one or more embodiments shown or described herein.
FIG. 5D schematically depicts an enlarged portion of the partial cross-sectional view of FIG. 4 in which another alternative configuration of the slit is illustrated, according to one or more embodiments shown or described herein.

As shown in FIG. 5C, another alternative configuration of the slit is illustrated at 1264. The slit 1264 is defined by an exterior side wall 1264A and an interior side wall 1264B. A protrusion 1265A extends outwardly from the exterior side wall 1264A and a cutout 1265B extends inwardly from the interior side wall 1264B. The protrusion 1265A has a shape that corresponds to the shape of the cutout 1265B such that the protrusion 1065A may be at least partially received within the cutout 1265B. As such, the slit 1264 does not linearly extend between the bottom surface 62C and the upper surface 62D of the bottom seal member 58. As such, a portion of the bottom edge 54 of the fixed window glass 32 that contacts the upper surface 62D of one of the exterior side portion 48A and interior side portion 48B is larger than a portion of the bottom edge 54 of the fixed window glass 32 that contacts the upper surface 62D of the other of the exterior side portion 48A and interior side portion 48B. The engagement between the protrusion 1265A and the cutout 1265B inhibits the movement of the fixed window glass 32 with respect to the fixed window seal 48 and the fixed window opening 28. In some embodiments, the adhesive 80 may be deposited between the exterior side wall 1264A and the interior side wall 1264B to close and bind the slit 1264. In some other embodiments, the adhesive 80 may be omitted.

As shown in FIG. 5D, another alternative configuration of the slit is illustrated at 1364. The slit 1364 is defined by an exterior side wall 1364A and an interior side wall 1364B. A distance between the exterior side wall 1364A and the interior side wall 1364B tapers or narrows as the slit 1364 extends from the bottom surface 62C towards the upper surface 62D of the bottom seal member 58. As such, a distance D2 between the exterior side wall 1364A and the interior side wall 1364B at the upper surface 62D is less than a distance D3 between the exterior side wall 1364A and the interior side wall 1364B at the bottom surface 62C. By narrowing the slit 1364 as the slit 1364 extends towards the upper surface 62D a contact area between the bottom edge 54 of the fixed window glass 32 and the upper surface 62D of the bottom seal member 58 is increased which inhibits movement of the fixed window glass 32 with respect to the fixed window seal 48 and the fixed window opening 28. Further, by widening the slit 1364 as the slit 1364 extends towards the bottom surface 62C of the bottom seal member 58, insertion of the fixed window glass 32 through the slit 1364 is facilitated. In some embodiments, the adhesive 80 may be deposited between the exterior side wall 1364A and the interior side wall 1364B to close and bind the slit 1364. In some other embodiments, the adhesive 80 may be omitted.

Figure 6:
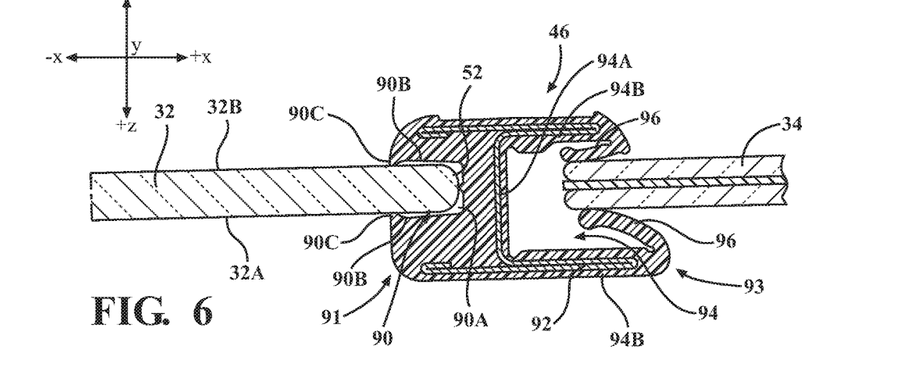
FIG. 6 schematically depicts a partial cross-sectional view of a division bar separating the fixed window assembly and the movable window assembly taken along the line 6-6 of FIG. 1, according to one or more embodiments shown or described herein.

Referring to FIG. 6, a cross-sectional view of the division bar 46 with the fixed window assembly 50 in the installed state is illustrated. As discussed above, the division bar 46 separates the fixed window opening 28 and the movable window opening 30 of the rear door assembly 14. The division bar 46 includes a fixed window side 91 and an opposite movable window side 93. The fixed window side 91 is configured to receive at least a portion of the fixed window glass 32. The movable window side 93 is configured to receive at least a portion of the movable window glass 34.

The fixed window side 91 of the division bar 46 includes a channel 90 configured to receive at least a portion of the fixed window glass 32 adjacent the side edge 52. The channel 90 includes a base wall 90A and a pair of side walls 90B that extend from the base wall 90A to a side surface of the division bar 46 such that the channel 90 is recessed with respect to the side surface of the fixed window side 91 of the division bar 46. Projections 90C extends outwardly from the pair of side walls 90B towards a center of the channel 90. Upon receiving the fixed window glass 32 within the channel 90, the projections 90C inhibit the ingress of water and other debris into the channel 90.

The movable window side 93 of the division bar 46 includes a glass run 94 configured to slidably receive the movable window glass 34 as the movable window glass 34 moves between the closed position and the at least partially opened position. The glass run 94 includes a base wall 94A and a pair of side walls 94B that define a window receiving cavity configured to receive at least a portion of the movable window glass 34. The glass run 94 may also include a pair of sealing lips 96. The pair of sealing lips 96 allow the movable window glass 34 to move between the closed position and the at least partially opened position while preventing the ingress of water or other debris into the glass run 94.

In some embodiments, the division bar 46 includes a reinforcement member 92. The division bar 46 may be formed by an extrusion process that integrally forms the channel 90 and the glass run 94. As discussed in greater detail below, the division bar 46 is fixed to the upper frame 44 to form the movable window opening 30 prior to the formation of the fixed window opening 28 by attaching the fixed window seal 48 to the movable window frame 38, specifically, the division bar 46. In some embodiments, the fixed window side 91 and the movable window side 93 of the division bar 46 are integrally formed as a one piece monolithic structure such that the channel 90 and the glass run 94 are integrally extruded or molded as a one piece monolithic structure.

In order facilitate a better understanding of the fixed window assembly 50, a discussion of the method of installation of the fixed window glass 32 will be provided. At the start of the installation method, a formation step of forming the fixed window seal 48 onto the movable window frame 38 is performed. Specifically, the movable window frame 38 is formed to define the movable window opening 30. After formation of the movable window frame 38, specifically, at least the front frame 42, the upper frame 44, and the division bar 46, the fixed window seal 48 is formed onto the movable window frame 38 prior to the installation of the fixed window glass 32. In some embodiments, the fixed window seal 48 is formed during a molding process that molds the fixed window seal 48 onto the movable window frame 38. During the molding process, the fixed window glass 32 is not provided within the fixed window opening 28 such that upon completion of the molding process the fixed window glass 32 is not within the fixed window opening 28 of the fixed window seal 48.

In some embodiments, the second end 58B of the bottom seal member 58 is molded onto the lower end 46A of the division bar 46, and the top end 60A of the side seal member 60 is molded onto the upper end 46B of the division bar 46. The molding of the fixed window seal 48 onto the division bar 46 results in the absence of gaps between the second end 58B of the bottom seal member 58 and the lower end 46A of the division bar 46 and between the top end 60A of the side seal member 60 and the upper end 46B of the division bar 46. As such, the formation step also includes the formation of the fixed window opening 28 due to the molding of the bottom seal member 58 and the side seal member 60 of the fixed window seal 48 onto the division bar 46.

In some embodiments, the formation step also includes the formation of the slit 64 in the bottom seal member 58 during the molding process of molding the fixed window seal 48 onto the movable window frame 38. In some other embodiments, the slit 64 is formed in a step subsequent to the molding the fixed window seal 48 onto the movable window frame 38.

Referring to FIG. 2, the fixed window assembly 50 is provided in the uninstalled state after completion of the formation step. As discussed above, in the uninstalled state, the fixed window glass 32 and the retainers 55 are disengaged and spaced apart from the fixed window seal 48.

An insertion step of inserting the fixed window glass 32 into the fixed window opening 28, defined by the bottom seal member 58, the side seal member 60, and the fixed window side 91 of the division bar 46, is performed. In the insertion step, the junction of the top end 52B of the side edge 52 and the upper end 56B of the sloped edge 56 of the fixed window glass 32 is first inserted through the slit 64 in the direction of arrow A. As the slit 64 functions as a guide for the fixed window glass 32, the insertion of the fixed window glass 32 is facilitated even in cases in which the bottom seal member 58 is rigid and partially resistant to deformation.

During the insertion step, the slit 64 is deformed so as to widen such that the fixed window glass 32 is inserted between the inner surface 48AA of the exterior side portion 48A and the inner surface 48BB of the interior side portion 48B as the fixed window glass 32 moves from the uninstalled state towards the installed state. As the fixed window glass 32 is moved in the direction of arrow A, the side edge 52 of the fixed window glass 32 is received within the channel 90 formed in the fixed window side 91 of the division bar 46. In some embodiments, a side channel is also formed in the side seal member 60 to receive at least a portion of the sloped edge 56 of the fixed window glass 32.

The fixed window glass 32 is continued to be moved in the direction of arrow A until the bottom edge 54 of the fixed window glass 32 passes entirely through the slit 64 such that a least a portion of the bottom edge 54 of the fixed window glass 32 is positioned above and/or contacts the upper surface 64C of the bottom seal member 58. Upon completion insertion step, the fixed window glass 32 is positioned within the fixed window opening 28, such that the side edge 52 is received within the channel 90 and the bottom edge 54 rests on the upper surface 64.6D of the bottom seal member 58. As the distance D1 between the inner surface 48AA of the exterior side portion 48A and the inner surface 48BB of the interior side portion 48B is less than the thickness T1 of the fixed window glass 32, the fixed window glass 32 is inhibited from moving with respect to the fixed window opening 28 in a direction opposite the direction of arrow A upon a return of the slit 64 to a pre-widened state.

A holding member coupling step of coupling the holding member 53 may be performed after completion of the insertion step. In some embodiments, the holding member coupling step may include an adhesive step of depositing the adhesive 80 that is performed after completion of the insertion step. In some embodiments, the holding member coupling step may include a retainer coupling step of coupling the retainers 55 to the bottom seal member 58 that is performed after completion of the insertion step. In some embodiments, the holding member coupling step may include the adhesive step of depositing the adhesive 80 that is performed after completion of the insertion step and the retainer coupling step of coupling the retainers 55 to the bottom seal member 58 that is performed after completion of the adhesive step.

As described above, the adhesive step of depositing the adhesive 80 may be performed after completion of the insertion step. During the adhesive step, the adhesive 80 is deposited within the slit 64 to close the slit 64 by filling the gap formed between the inner surface 48AA of the exterior side portion 48A and the inner surface 48BB of the interior side portion 48B. By depositing the adhesive 80 within the slit 64, the slit 64 is inhibited from being opened such that the fixed window glass 32 is inhibited from moving with respect to the fixed window seal 48. As the adhesive 80 is deposited within the slit 64, the bottom edge 54 of the fixed window glass 32 is inhibited from moving beyond the upper surface 62D of the bottom seal member 58 by the adhesive 80. It is appreciated that the adhesive step may be omitted. In some embodiments, the adhesive 80 is deposited continuously within and along the entire length of the slit 64. In some other embodiments, the adhesive 80 is deposited discontinuously along the slit 64 such that the slit 64 is configured to direct water out of the fixed window seal 48 and/or the fixed window opening 28.

As described above, the retainer coupling step of coupling the retainers 55 to the bottom seal member 58 may be performed after completion of the adhesive step or may be performed after completion of the insertion step when the adhesive step is omitted. In the coupling step, the retainers 55 are coupled to the bottom seal member 58 of the fixed window seal 48. As show in FIG. 2, the retainers 55 are moved in the direction of arrow A such that the bottom seal member 58 is received within the retainer cavity 76.

As shown in FIG. 4, the retainer 55 is coupled to the bottom seal member 58 such that the bottom surface 62C of the bottom seal member 58 contacts the upper surface 70A of the base wall 70 of the retainer 55, the exterior surface 62A of the exterior side portion 48A of the bottom seal member 58 contacts the inner surface 72A of the exterior side wall 72 of the retainer 55, and the interior surface 62B of the interior side portion 48B of the bottom seal member 58 contacts the inner surface 74A of the interior side wall 74 of the retainer 55. The retainer 55 inhibits movement of the fixed window glass 32 with respect to the bottom seal member 58, specifically, the bottom surface 62C of the bottom seal member 58. As the retainer 55 is coupled to the bottom seal member 58, bottom edge 54 of the fixed window glass 32 is inhibited from moving beyond the bottom surface 62C of the bottom seal member 58 by the upper surface 70A of the base wall 70 of the retainer 55 as the base wall 70 covers the slit 64.

As discussed above, in some embodiments. the distance between the inner surface 72A of the exterior side wall 72 and the inner surface 74A of the interior side wall 74 narrows towards the distal end 72C and the distal end 72D. As such, the narrowing of the exterior side wall 72 and the interior side wall 74 may provide a frictional engagement between the retainer 55 and the bottom seal member 58.

In some embodiments, the retainer coupling step may include a clamping process in which the exterior side wall 72 and the interior side wall 74 of the retainer 55 are clamped or crimped to couple the retainer 55 to the bottom seal member 58 to inhibit movement of the retainer 55 with respect to the bottom seal member 58. In some embodiments, the retainer coupling step may be omitted.

In the illustrated embodiments, the rear door assembly 14 is a second row door assembly. However, the rear door assembly 14 is not limited to use with a second row door assembly. In the illustrated embodiments, the fixed window assembly 50 is provided on the rear door assembly 14. However, the fixed window assembly 50 is not limited to use with the rear door assembly 14 and may be utilized in the front door assembly 12 or the cargo door assembly 16.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A door assembly comprising:
    a door frame having a first window seal and a second window frame, the first window seal at least partially defining a first window opening, the second window frame at least partially defining a second window opening, the second window frame having a division bar that separates the first window opening and the second window opening, the first window seal having a bottom seal member and a side seal member that extends between the bottom seal member and the division bar, the bottom seal member includes a slit extending along a longitudinal direction of the bottom seal member, the slit extends through the bottom seal member between an upper surface of the bottom seal member and a bottom surface of the bottom seal member;
    a first window glass configured to be inserted into the first window opening through the slit; and
    a holding member coupled to the bottom seal member to inhibit movement of the first window glass with respect to the first window opening.

2. The door assembly of claim 1, wherein the holding member is an adhesive deposited within the slit after the first window glass is inserted into the first window opening.

3. The door assembly of claim 1, wherein the holding member is a retainer that is coupled to the bottom seal member.

4. The door assembly of claim 3, wherein the holding member further includes an adhesive deposited within the slit after the first window glass is inserted into the first window opening and before the retainer is coupled to the bottom seal member.

5. The door assembly of claim 4, wherein the retainer includes a base wall and a pair of side walls that define a generally U-shape, the base wall covers the slit formed on the bottom surface of the bottom seal member.

6. The door assembly of claim 5, wherein the retainer is a pair of retainers.

7. The door assembly of claim 1, wherein the division bar includes a channel on a first window opening side and a glass run on a second window opening side, the channel and the glass run are integrally formed as a one piece monolithic structure.

8. The door assembly of claim 7, wherein the second window opening is configured to receive a second window glass movable between a closed position and at least a partially opened position within the glass run on the second window opening side of the division bar.

9. A vehicle comprising:
 a door frame having a first window seal and a second window frame, the first window seal at least partially defining a first window opening, the second window frame at least partially defining a second window opening, the second window frame having a division bar that separates the first window opening and the second window opening, the first window seal having a bottom seal member and a side seal member that extends between the bottom seal member and the division bar, the bottom seal member includes a slit extending along a longitudinal direction of the bottom seal member, the slit extends through the bottom seal member between an upper surface of the bottom seal member and a bottom surface of the bottom seal member;
 a first window glass configured to be inserted into the first window opening through the slit; and
 a holding member coupled to the bottom seal member to inhibit movement of the first window glass with respect to the first window opening.

10. The vehicle of claim 9, wherein the holding member is an adhesive deposited within the slit after the first window glass is inserted into the first window opening.

11. The vehicle of claim 9, wherein the holding member is a retainer that is coupled to the bottom seal member.

12. The vehicle of claim 11, wherein the holding member further includes an adhesive deposited within the slit after the first window glass is inserted into the first window opening and before the retainer is coupled to the bottom seal member.

13. The vehicle of claim 12, wherein the retainer includes a base wall and a pair of side walls that define a generally U-shape, the base wall covers the slit formed on the bottom surface of the bottom seal member.

14. The vehicle of claim 13, wherein the retainer is a pair of retainers.

15. The vehicle of claim 9, wherein the division bar includes a channel on a first window opening side and a glass run on a second window opening side, the channel and the glass run are integrally formed as a one piece monolithic structure.

16. The vehicle of claim 15, wherein the second window opening is configured to receive a second window glass movable between a closed position and at least a partially opened position within the glass run on the second window opening side of the division bar.

17. A method of installing a first window glass into a first window opening of a door frame, the method comprising:
 providing a first window seal that defines the first window opening, the first window seal includes a bottom seal member having a slit;
 inserting the first window glass into the first window opening through the slit formed in the bottom seal member of the first window seal; and
 coupling a holding member to the bottom seal member of the first window seal to inhibit movement of the first window glass with respect to the first window seal,
 wherein the holding member is at least one of an adhesive deposited within the slit after the first window glass is inserted into the first window opening and a retainer that includes a base wall and a pair of side walls that define a generally U-shape, the base wall covers the slit formed on a bottom surface of the bottom seal member.

18. The method of claim 17, wherein the first window opening is formed by molding the first window seal onto a division bar that separates the first window opening from a second window opening configured to receive a second window glass movable between a closed position and at least a partially opened position.

19. The method of claim 18, wherein the first window glass is inserted into the first window opening after the first window seal is molded onto the division bar.

\* \* \* \* \*